United States Patent [19]
Reginato

[11] Patent Number: 5,104,631
[45] Date of Patent: Apr. 14, 1992

[54] PROCESS FOR PRODUCING SODIUM PERBORATE MONOHYDRATE, PARTIALLY CRYSTALLIZED SODIUM PERBORATE MONOHYDRATE, AND WASHING POWDERS FOR TEXTILES

[75] Inventor: Luigi Reginato, Rosignano-Solvay/Livorno, Italy

[73] Assignee: Interox Chimica S.p.A., Rosignano-Solvay/Livorno, Italy

[21] Appl. No.: 301,686

[22] Filed: Jan. 26, 1989

[30] Foreign Application Priority Data

Jan. 26, 1988 [IT] Italy .................. 19211 A/88

[51] Int. Cl.$^5$ .................. C01B 15/12; C01B 35/12; C22B 1/14
[52] U.S. Cl. .................. 423/279; 423/281; 23/313 FB
[58] Field of Search .................. 423/279, 281, 415 P; 23/313 FB

[56] References Cited

U.S. PATENT DOCUMENTS

| | | | |
|---|---|---|---|
| 3,623,836 | 11/1971 | Denaey et al. | 423/281 |
| 3,914,380 | 10/1975 | Dillenberg et al. | 423/279 |
| 4,020,148 | 4/1977 | Mohr et al. | 423/415 P |
| 4,115,519 | 9/1978 | Brichard et al. | 423/279 |
| 4,185,960 | 1/1980 | Brichard et al. | 423/281 |

FOREIGN PATENT DOCUMENTS

| | | | |
|---|---|---|---|
| 739722 | 10/1968 | Belgium | 423/279 |
| 194952 | 9/1986 | European Pat. Off. | 423/279 |
| 1801470 | 1/1970 | Fed. Rep. of Germany | 423/281 |
| 7342076 | 6/1974 | France . | |
| 2285339 | 4/1976 | France . | |
| 2417470 | 10/1979 | France | 423/279 |
| 555609 | 6/1986 | Spain . | |
| 1246915 | 9/1971 | United Kingdom . | |

OTHER PUBLICATIONS

"Norme Internationale ISO 5937", Ref. No: ISO 5937-1980 (I).

Primary Examiner—Gary P. Straub
Attorney, Agent, or Firm—Spencer & Frank

[57] ABSTRACT

Process for producing sodium perborate monohydrate by dehydration of sodium perborate tetrahydrate using a current of air which is initially damp in a first phase of dehydration then dry in a second phase of dehydration. The sodium perborate monohydrate obtained can be used in washing powders for textiles. No diagrams.

7 Claims, No Drawings

PROCESS FOR PRODUCING SODIUM PERBORATE MONOHYDRATE, PARTIALLY CRYSTALLIZED SODIUM PERBORATE MONOHYDRATE, AND WASHING POWDERS FOR TEXTILES

The invention relates to a process for producing sodium perborate monohydrate by dehydration of sodium perborate tetrahydrate.

Sodium perborate monohydrate, having the stoichiometric formula $NaBO_3 \cdot H_2O$, has a large outlet in the preparation of washing powders, by virtue of its high content of active oxygen and its high rate of dissolution in water.

A generally used technique for obtaining sodium perborate monohydrate consists in dehydrating sodium perborate tetrahydrate (having the stoichiometric formula $NaBO_3 \cdot 4 H_2O$) in a fluidized bed, using a current of hot air. In the known processes according to this technique, operating conditions have generally been sought which allow sodium perborate monohydrate to be obtained which has a high hardness, so that it offers high resistance to attrition. To this end, in the process described in the Patent BE-A-718160 (SOLVAY & Cie), ambient air, preheated to a temperature of at least 180° C., preferably between 180° and 210° C. is used. However, the use of such high temperatures is onerous, and implies taking precautions with regard to the oxidizing character of sodium perborate.

In the Patent BE-A-807724 (PEROXID-CHEMIE GmbH), the use of hot, damp air is recommended, the temperature and humidity of which are controlled, at the inlet to the bed, so that the air temperature, at the outlet from the bed, is at least 60° C., in order to cause superficial fusion of the sodium perborate. The sodium perborate monohydrate obtained by this known process has the peculiarity that its content of active oxygen rapidly diminishes when it is exposed to ambient atmospheric air. This peculiarity is a serious disadvantage, because it implies taking special measures for storing or handling the sodium perborate monohydrate and moreover it leads to rapid worsening of the washing properties of washing powders.

The object of the invention is to remove the disadvantages of known processes, by providing a new process which allows sodium perborate monohydrate to be obtained by dehydration of sodium perborate tetrahydrate, the sodium perborate monohydrate simultaneously having high resistance to attrition and good stability with regard to its content of active oxygen.

The invention thus relates to a process for producing sodium perborate monohydrate by dehydration of a bed of sodium perborate tetrahydrate in a current of air. According to the invention, a current of air is used which is initially damp in a first phase of dehydration, then dry in a second phase of dehydration.

In the process according to the invention, the air used at the inlet to the bed of sodium perborate tetrahydrate is hot air having a temperature generally above 60° C. and preferably a minimum of 80° C.; it is desirable that its temperature is not higher than 180° C. Temperatures of between 90° and 150° C. are most adequate.

The throughput of air to be used is dependent on various parameters, among which are particularly the particle size distribution of the sodium perborate tetrahydrate, the volume of the bed and the area of its cross-section as well as the density desired for the sodium perborate monohydrate; it must be regulated to ensure a stable fluidized bed for the whole duration of dehydration. In practice, the throughput of air, at the inlet to the bed, can for example be fixed at between 0.5 and 30 $Nm^3$ per hour and per kg of sodium perborate tetrahydrate, values between 1 and 20 $Nm^3$ being most adequate in the majority of cases.

Dry air is defined as anhydrous air, or more generally, as air drawn from the environment, whose partial water vapour pressure is no greater than the saturation vapour pressure under standard conditions of pressure and temperature; hence, it is most often ambient air having a relative humidity of between 40 and 100% at standard conditions of atmospheric pressure and temperature.

The damp air used in the first phase of dehydration is air whose absolute humidity is greater than that of the dry air used in the second phase of dehydration. According to the invention, damp air can be used with advantage, whose humidity content is greater than that corresponding to the saturation vapour pressure of ambient air under standard conditions of atmospheric pressure and temperature. It is nevertheless advisable that the total quantity of water in the damp air at the inlet to the bed is less than that corresponding to the saturation vapour pressure of the air at the temperature which it has on leaving the bed. The optimal value of the total quantity of water in the damp air used in the first phase of dehydration is thus dependent on other operating conditions such as the temperature and the throughput of damp air at the inlet to the bed and the temperature of the bed; it can easily be determined in each particular case by a routine laboratory procedure.

In the process according to the invention, the relative importance of each phase of dehydration is dependent on the quality of sodium perborate tetrahydrate used and the desired characteristics of the sodium perborate monohydrate (particularly its hardness and its stability in relation to its content of active oxygen). In practice, it is recommended that the duration of the first phase of dehydration does not exceed 50% of the total duration of dehydration. It is desirable that the duration of the first phase is a minimum of 2% of the total duration of dehydration, values of between 5 and 40% being preferred.

In a particular embodiment of the process according to the invention, the humidity content of the air used in each phase of dehydration is regulated so that the relative humidity of the air, in thermal equilibrium with the solid phase at the outlet from the bed, is between 15 and 80% in the first phase and between 10 and 60% in the second phase. Preferred values for the relative humidity of the air at the outlet from the bed are those between 20 and 70% in the first phase and between 15 and 50% in the second phase, the relative humidity of the air in the first phase being greater than that of the air in the second phase.

In a particularly advantageous embodiment of the process according to the invention, the temperature of the air which is introduced into the bed is the same in the two phases of dehydration, so that the temperature of the bed in the first phase of dehydration is greater than its temperature in the second phase.

In this embodiment of the process according to the invention, the difference between the temperatures of the bed in the first phase and in the second phase of dehydration is fixed between 1° and 10° C. Values for the said difference of between 2° and 7° C. are preferred. To this end, the temperature and the humidity of the air can for example be regulated so that the temperature of the bed is fixed between 45° and 85° C. during the first phase of dehydration and between 40° and 80° C. during the second phase, the preferred temperatures being those between 50° and 70° C. for the first phase and between 45° and 65° C. for the second phase, the temperature of the bed in the first phase being greater than its temperature in the second phase. These temperatures can readily be obtained in the bed by fixing the temperature of the air, at the inlet to the bed, between 80° and 180° C., temperatures between 90° and 150° C. being preferred. According to a particular alternative embodiment of the process according to the invention, it is preferred to select a bed temperature for the first phase of dehydration which is less than the temperature normally known as the "fusion temperature" of sodium perborate, which generally does not exceed 65° C. In this alternative embodiment of the process, the preferred temperatures for the bed are those between 52° and 62° C. in the first phase of dehydration and between 50° and 60° C. in the second phase.

At the end of the second phase of dehydration, an increase in the temperature of the bed is generally observed, which indicates that dehydration of the sodium perborate from the tetrahydrate state to the monohydrate state is finished.

In the process according to the invention it is generally advantageous to have a step in which the sodium perborate tetrahydrate is brought to temperature, before the first phase of dehydration.

Other things being equal, the properties of the sodium perborate monohydrate obtained at the end of the process according to the invention will depend on those of the sodium perborate tetrahydrate used. In particular, under the same operating conditions, the resistance to attrition of sodium perborate monohydrate is generally better insofar as that of the sodium perborate tetrahydrate is good. It is thus advantageous to use sodium perborate tetrahydrate having a high resistance to attrition, characterized for example by an index not greater than 4.5% according to the standard ISO 5937. The use of sodium perborate tetrahydrate having an index of resistance to attrition according to the standard ISO 5937 not exceeding 3%, preferably not exceeding 2.5%, is particularly recommended.

The process according to the invention may be carried out discontinuously in a single fluidized bed reactor which is fed successively with damp air and with dry air. Alternatively, the process may be carried out continuously in a series of two fluidized bed reactors, one of which is fed with damp air and the other of which is fed with dry air. It is also possible to use a number of reactors greater than two, which are fed with air whose humidity content diminishes from one reactor to the next. In this latter alternative embodiment of the process according to the invention, the throughput of air may also be regulated so that it diminishes from one reactor to the next.

In the process according to the invention, the sodium perborate monohydrate produced during the first phase of dehydration consists predominantly of amorphous material, while that formed during the second phase of dehydration is for the most part in the crystalline state. The sodium perborate obtained using the process according to the invention thus comprises a mixture of crystalline material and amorphous material which have been revealed by the X-ray diffraction method. It combines a high resistance to attrition and good stability shown by a moderate rate of loss of active oxygen over time. Without wishing to be bound to a theoretical explanation, the opinion of the applicant is that these superior properties of sodium perborate monohydrate are due to the morphological structure of its particles, which could comprise a crystalline nucleus within an amorphous envelope. The good stability previously mentioned for sodium perborate monohydrate would then result from the crystalline nature of its nucleus, while the superior hardness of its amorphous envelope would give it high resistance to attrition. In other respects, beginning with sodium perborate tetrahydrate of equal quality, the process according to the invention allows sodium perborate monohydrate to be obtained, which has a specific surface area greater than that obtained with the known process described in the document BE-A-807724.

The invention thus relates also to sodium perborate monohydrate, obtainable by the process according to the invention, which is in the partially crystalline state and which has a content of amorphous material of at most 60% by weight, a degree of consumption by attrition of at most 10% and a stability corresponding to a weight loss of active oxygen of less than 60% of its original content, after 50 days of storage in ambient air at 55° C.

In the preceding definition of sodium perborate monohydrate according to the invention, the degree of consumption by attrition is defined according to the standard ISO 5937.

The invention relates particularly to sodium perborate monohydrate containing between 20 and 60% by weight of amorphous material, for example between 35 and 60%, and between 150 and 160 g of active oxygen per kg and which has a degree of consumption by attrition of between 2 and 8% and a stability corresponding to a weight loss of active oxygen of between 20 and 55% of its original content, after 50 days of storage in air at 55° C.

A particularly advantageous form of sodium perborate monohydrate according to the invention has a specific surface area of less than 10 m$^2$/g, for example between 4 and 8 m$^2$/g.

Due to its high resistance to attrition and its good stability in relation to its content of active oxygen, the sodium perborate monohydrate according to the invention has a valuable outlet in the production of powders for washing textiles.

The invention thus also relates to washing powders for textiles, which contain sodium perborate monohydrate according to the invention.

The value of the invention will be apparent from reading the examples of use which are described below. In these examples, the expression "dry air" means air drawn from the environment, complying with the definition which has been given for it above. The resistance to attrition is defined according to the standard ISO 5937. The content of active oxygen was determined by titration using potassium permanganate and is expressed in g of $O_2$ per kg of material.

I. First series of examples (Examples 1 to 4)

In the following Examples 1 to 4, sodium perborate tetrahydrate having the following characteristics has been used:

| | |
|---|---|
| average particle diameter | 388 microns |

-continued

| | |
|---|---|
| apparent density | 0.84 kg/dm³ |
| resistance to attrition | 2% |
| content of active oxygen | 102 g/kg. |

2 kg of sodium perborate tetrahydrate was loaded into a fluidized bed dryer which was fed with ambient air containing 14 g of water vapour per kg, preheated to 100° C., at a throughput rate of 16.5 Nm³/h.

Examples 1 and 2 relate to two trials which were carried out under the conditions according to the invention. Examples 3 and 4 relate to comparative trials which were carried out under conditions which did not conform to the process according to the invention.

EXAMPLE 1 in accordance with the invention

The operation of the bed comprised the three successive steps:

Step No. 1: bringing the sodium perborate tetrahydrate up to temperature;
Step No. 2: first phase of dehydration using damp air;
Step No. 3: second phase of dehydration using dry air.

During Step No. 1, which lasted 7 minutes, the bed of sodium perborate was fed with ambient air preheated to 100° C., as explained above.

During Step No. 2, which lasted 43 minutes, water vapour was introduced into the air, upstream of the bed.

During Step No. 3, which lasted 50 minutes, water vapour feeding was terminated, so that the air admitted to the bed was ambient air as such.

At the end of Step No. 3, the temperature of the bed increased rapidly, indicating that conversion of sodium perborate from the tetrahydrate form to the monohydrate form was finished.

The operating conditions are given below:

| | | |
|---|---|---|
| Step No. 1: | duration (min) | 7 |
| Step No. 2: | duration (min) | 43 |
| | temperature of the bed (°C.) | 57.9 |
| | relative humidity of the air at the outlet from the bed (%) | 46 |
| Step No. 3: | duration (min) | 50 |
| | temperature of the bed (°C.) | 52 |
| | relative humidity of the air at the outlet from the bed (%) | 28 |
| Final temperature of the bed (°C.) | | 66.2. |

EXAMPLE 2 in accordance with the invention

The conditions of Example 1 were repeated, except for the durations of Steps Nos. 2 and 3, which were respectively 28 minutes (Step No. 2) and 70 minutes (Step No. 3). The temperature of the bed was fixed at approximately the same values as those in Example No. 1.

EXAMPLE 3 comparative

The conditions of Example 1 were repeated, excepting only that introduction of water vapour into the air during Step No. 2 (first phase of dehydration), was omitted. The bed was thus fed throughout with dry air for 100 minutes. During dehydration, the temperature of the bed was fixed at 53° C. and the relative humidity of the air at the outlet from the bed was fixed at 28%. At the end of the process (which lasted 100 minutes), the temperature of the bed increased to 66.7° C.

EXAMPLE 4 comparative

The conditions of the trial in Example 1 were changed, by introducing water vapour into the air, upstream of the bed, during both phases of dehydration (Steps Nos. 2 and 3). During dehydration, the temperature of the bed was fixed at 60.5° C. and the relative humidity of the air at the outlet from the bed was fixed at 45%. After 100 minutes of treatment, the temperature of the bed rose to 67.7° C.

The characteristics of the sodium perborate monohydrate obtained in each of the Examples 1 to 4 which have just been described are given in Table I.

TABLE I

| | Example No. | | | |
|---|---|---|---|---|
| | 1 | 2 | 3 | 4 |
| Apparent density (kg/dm³) | 0.58 | 0.59 | 0.58 | 0.58 |
| Specific surface area (m²/g) | 6.1 | 7.0 | 9.1 | 2.2 |
| Content by weight of amorphous material (%) | 57 | 43 | 32 | 78 |
| Resistance to attrition (%) | 2.5 | 2.1 | 4.0 | 2.3 |
| Content of active oxygen (g/kg) | | | | |
| initial | 158.2 | 155.1 | 155.7 | 158 |
| after 7 days | 153.3 | 153.4 | 153.9 | 145.3 |
| after 25 days | 133.5 | 145.5 | 147.9 | 90.6 |
| after 50 days | 105.2 | 120 | 131.8 | 58.0 |
| Loss of active oxygen after 50 days (%) | 34 | 23 | 16 | 63 |

In Table I, the resistance to attrition was measured by the method ISO 5937. The content of active oxygen after 7, 25 and 50 days was determined after keeping the sodium perborate monohydrate in contact with ambient air at 55° C.

It is seen that the sodium perborate monohydrate obtained in Examples 1 and 2 (in accordance with the invention) show an optimal compromise in relation to the resistance to attrition and the loss of active oxygen.

II. Second series of examples (Examples 5 to 7)

In these examples, sodium perborate tetrahydrate having the following characteristics was used:

| | |
|---|---|
| average particle diameter | 302 microns |
| apparent density | 0.83 kg/dm³ |
| resistance to attrition | 4.1% |
| content of active oxygen | 102.1 g/kg. |

2 kg of this sodium perborate tetrahydrate was loaded into the fluidized bed dryer, and this was fed with ambient air containing 16.6 g of water vapour per kg, preheated to 118° C., at a throughput rate of 13.2 Nm³/h.

Example 5 relates to a trial which was carried out under conditions in accordance with the process according to the invention. Examples 6 and 7 relate to comparative trials under conditions which are not in accordance with the process according to the invention.

EXAMPLE 5 in accordance with the invention

The operation of the bed comprises three steps Nos. 1, 2, 3 defined above for Example 1; these were carried out under the following conditions:

| | | |
|---|---|---|
| Step No. 1: | duration (min) | 7 |
| Step No. 2: | duration (min) | 43 |
| | temperature of the bed (°C.) | 60 |
| | relative humidity of the air at the outlet from the bed (%) | 40 |
| Step No. 3: | duration (min) | 55 |
| | temperature of the bed (°C.) | 55 |
| | relative humidity of the air at the outlet from the bed (%) | 30 |
| Final temperature of the bed (°C.) | | 67. |

EXAMPLE 6 comparative

The conditions of Example 5 were repeated, except that introduction of water vapour into the air during Step No. 2 was omitted. The total duration of the treatment in the fluidized bed reactor was moreover 105 minutes, during which the bed was thus fed exclusively with dry air. The temperature of the bed was fixed at 53.5° C. and the relative humidity of the air at the outlet from the bed was fixed at 28%. After dehydration, the temperature of the bed increased to 66° C.

EXAMPLE 7 comparative

The conditions of the trail in Example 5 were altered, by using ambient air, into which a surplus of water vapour was introduced for the whole of the dehydration treatment which lasted 108 minutes. During dehydration, the temperature of the bed was fixed at 61.5° C. and the relative humidity of the air at the outlet from the bed was fixed at 40%. After dehydration, the temperature of the bed increased to 66° C.

The characteristics of the sodium perborate monohydrate obtained in each of the Examples 5 to 7, are given in Table II.

TABLE II

| | Example No. | | |
|---|---|---|---|
| | 5 | 6 | 7 |
| Apparent density (kg/dm³) | 0.56 | 0.55 | 0.57 |
| Specific surface area (m²/g) | 5 | 7 | 3 |
| Content by weight of amorphous material (%) | 43 | 24 | 62 |
| Resistance to attrition (%) | 7.7 | 12.1 | 6.6 |
| Content of active oxygen (g/kg) | | | |
| initial | 156.7 | 155.9 | 154.3 |
| after 7 days | 154.3 | 154.2 | 141.5 |
| after 25 days | 145.1 | 148.2 | 80.8 |
| after 50 days | 83.9 | 88.2 | (*) |
| Loss of active oxygen after 50 days (%) | 47 | 44 | 100 |

(*) = total decomposition.

A comparison of the results of Examples 5, 6 and 7 shows that the sodium perborate monohydrate of Example 5 (in accordance with the invention) combines optimal characteristics for resistance to attrition and stability in relation to the content of active oxygen.

In the trials which have just been described in Examples 1 to 7, the specific surface area was measured using the BET method based on the determination of adsorption and desorption isotherms of nitrogen (Journal of the American Chemical Society—Vol. 60 (1938)—S. Brunauer, P. H. Emmet, E. Teller: "Adsorption of Gases in Multimolecular Layers"—pages 309 to 319).

I claim:

1. Process for producing sodium perborate monohydrate by dehydrating a bed of sodium perborate tetrahydrate in at least one fluidized bed reactor with a current of air, said current of air being initially at a temperature about 60° C. and at a first relative humidity in a first phase of dehydration, and at a second relative humidity in a second phase of dehydration, said first relative humidity being higher than said second relative humidity, and recovering sodium perborate monohydrate at the end of said second phase of dehydration, the time of the first phase of dehydration being between 2 and 50% of the total time of dehydration, the temperature of the fluidized bed in the first phase of dehydration being at most about 65° C. but lower than the fusion temperature of the sodium perborate tetrahydrate and greater than the temperature of the fluidized bed in the second phase of dehydration.

2. Process according to claim 1, wherein the humidity content of the air used is regulated, so that the relative humidity of the air at the outlet from the bed is between 15 and 80% in the first phase of dehydration and between 10 and 60% in the second phase.

3. Process according to claim 1, wherein the temperature and the humidity of the air are regulated at the inlet to the fluidized bed, so that the temperature of the fluidized bed in the first phase is between about 1° and 10° C. greater than the temperature in the second phase of dehydration.

4. Process according to claim 1, wherein the temperature of the bed is between 52° and 62° C. in the first phase of dehydration and the temperature of the bed is between 50° and 60° C. in the second phase.

5. Process according to claim 1, wherein said sodium perborate tetrahydrate has an index of resistance to attrition, according to the standard ISO 5937, not exceeding 4.5%.

6. Process according to claim 1, wherein said dehydration is carried out discontinuously in a single fluidized bed reactor which is first fed with the air having said higher relative humidity and then fed with the air having a lower relative humidity.

7. Process according to claim 1, wherein said dehydration is carried out continuously in a series of two fluidized bed reactors including a first fluidized bed reactor fed with the air having said higher relative humidity and a second fluidized bed reactor fed with the air having said lower relative humidity.

* * * * *